United States Patent [19]

Steck et al.

[11] Patent Number: 4,464,819

[45] Date of Patent: Aug. 14, 1984

[54] HINGE PIN REMOVAL APPARATUS

[75] Inventors: George L. Steck, Dayton; Raymond E. Steck, Miamisburg; Laurence D. Steck, Dayton, all of Ohio

[73] Assignee: Steck Manufacturing Co., Inc., Dayton, Ohio

[21] Appl. No.: 558,691

[22] Filed: Dec. 6, 1983

Related U.S. Application Data

[63] Continuation of Ser. No. 369,071, Apr. 16, 1982, abandoned.

[51] Int. Cl.[3] .......................... B23P 19/04; B66F 3/00

[52] U.S. Cl. ........................................ 29/267; 29/244; 254/119; 254/129; 254/131

[58] Field of Search ................. 29/244, 253, 267, 247, 29/249; 254/113, 119, 120, 129, 130, 131, 131.5

[56] References Cited

U.S. PATENT DOCUMENTS

| | | | |
|---|---|---|---|
| 1,249,653 | 12/1917 | Morrow | 29/219 |
| 1,323,476 | 12/1919 | Ingram | 29/219 |
| 1,770,621 | 7/1930 | McElwee, Sr. et al. | |
| 3,110,959 | 11/1963 | Blackstone | 254/129 |
| 3,602,969 | 9/1971 | Provost | 254/131 |
| 3,689,977 | 9/1972 | Crabbe | 29/253 |
| 3,967,361 | 7/1976 | Merkel et al. | 29/267 |
| 4,015,871 | 4/1977 | Koerbel et al. | 294/19 R |
| 4,293,992 | 10/1981 | Webb | 29/267 |

*Primary Examiner*—Howard N. Goldberg
*Assistant Examiner*—Steven E. Nichols
*Attorney, Agent, or Firm*—H. Talman Dybvig

[57] ABSTRACT

Apparatus for removing an automobile hinge pin by disabling a spring clip and thereafter driving the hinge pin outwardly of the automobile hinge assembly while supporting the hinge assembly against bending forces that would otherwise flex the hinge assembly as the hinge pin is driven outwardly.

10 Claims, 10 Drawing Figures

HINGE PIN REMOVAL APPARATUS

This is a continuation of application Ser. No. 369,071 filed Apr. 16, 1982, for Hinge Pin Removal Apparatus, now abandoned.

SUMMARY OF THE INVENTION

An automobile door hinge typically comprises a first hinge part affixed to the automobile frame and a second interfitting hinge part attached to the automobile door, together with a hinge pin passing through aligned apertures of the interfitting parts, the interfitting parts permitting the door to swing outwardly and then inwardly to respectively open and close the door opening. Typically the automobile door will be supported by two sets of interfitting hinge parts and associated hinge pins. The present invention is concerned with the removal of such doors for purposes of repair and the like.

With the increasing popularity of small cars, door sizes have diminished and the space available for door hinges and hinge pins has been reduced proportionately with the practice having developed of welding the hinge parts directly to the frame and to the doors to be mounted thereon.

In a common construction each door hinge comprises interfitting parts one of which is welded to the automobile frame and the other which is welded to an automobile door with the parts being interfitted to receive a hinge pin one end of which is splined for seizing engagement to one of the hinge parts so that the hinge pin will not accidentally fall away from the hinge assembly. To this same end, the hinge pin is provided with a spring clip having outwardly flared fingers which bend inwardly to facilitate hinge construction and, as construction is completed, snap outwardly to resist any disassembly of the assembled hinge. In the practice of the present invention, clamp means are fabricated for reversing the outward snap of the spring clip fingers in preparation for disassembly and specially fashioned lever means having a pry bar adjustably mounted thereto are employed in combination with the pry bar to force the hinge pin against its seizing fit to the aforementioned hinge part, thus to free the hinge pin for removal from the hinge parts along with the aforementioned spring clip. The lever and its adjustably mounted pry bar are provided with plural cleft portions and plural cup portions which allow a single lever and pry bar adjustably mounted thereon to be utilized in the removal of hinge pins of varying sizes such as are currently used by varying manufacturers of automobile bodies.

BRIEF DESCRIPTION OF THE DRAWINGS

In the drawings:

FIG. 2 also illustrates a hinge pin engaging clamp in accordance with the present invention, the clamp having been exploded away from engagement with the hinge pin.

DETAILED DESCRIPTION

Figure 1:
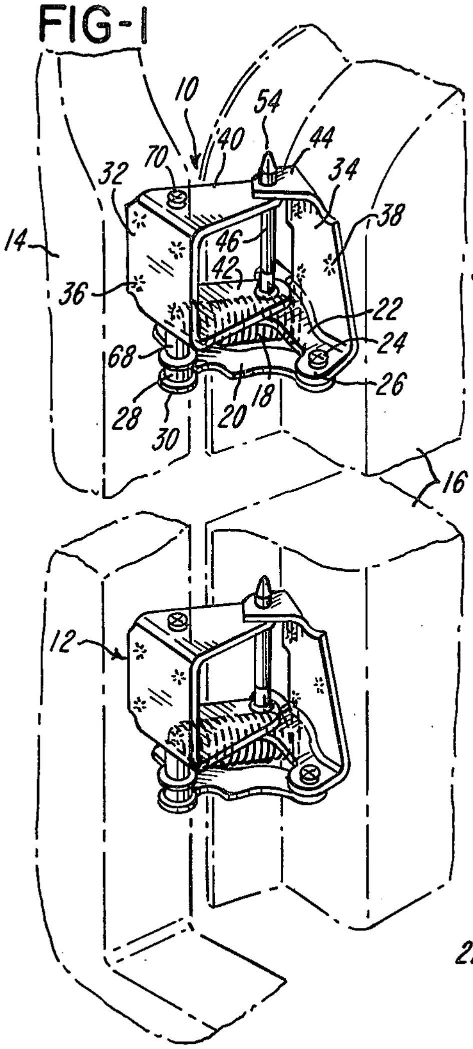
FIG. 1 illustrates fragmentarily and in broken lines portions of an automobile body and portions of an automobile door, and illustrates in solid lines a pair of hinge assemblies of the type which are welded to the frame of the automobile body and to the door and when equipped with hinge springs as illustrated, function to position the door in one of three positions, namely, a closed position, a partially open position and a fully open position.
Figure 2:
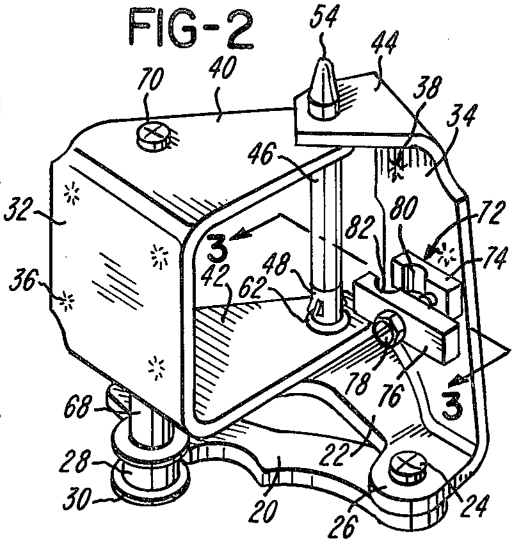
FIG. 2 is an enlarged perspective illustration showing a hinge pin assembly, the door and frame of FIG. 1 having been omitted and the hinge spring having been removed for purposes of clarity.

Referring to the drawings in greater detail, FIG. 1 illustrates with solid lines an upper hinge assembly 10 and a lower hinge assembly 12, these two hinge assemblies being illustrated in approximate relationship to the frame 14 of a vehicle and to the right-hand door 16 of such vehicle, the frame and door being fragmentarily illustrated with broken lines. The representations of the hinge assemblies 10 and 12 have been derived from an examination of commercially marketed General Motors parts. FIG. 1 shows the hinge assembly before removal therefrom of the spring 18. FIG. 2 shows the hinge assembly 10 after the spring 18 has been removed. When present, the hinge spring is caged between a restrainer 20 and an arm, not shown, turned downwardly from a wall 22 appearing in FIGS. 1 and 2. The restrainer 20 is pivoted to the wall 22 by means of a pin 24 staked into a lug 26 formed integrally on the wall 22. The action of the hinge spring, when present, is to bias the restrainer 20 forwardly as it appears in FIG. 2 to engage a roller 28 having guide shoulders 30 thereabout between which are received the restrainer 20. The restrainer 20 can be seen to have arcuate detent portions which are followed by the roller 28 to establish intermediate-open and full-open automobile door positions which are held by the force developed by the spring 18 between the restrainer 20 and the aforementioned turned-down portion of the wall 22.

Since the upper and lower hinge assemblies 10 and 12 are identical in all material respects, only the hinge assembly 10 will be described in detail.

In FIG. 2 it can be seen that the hinge assembly 10 comprises a generally U-shaped hinge part 32 and a hinge plate 34. As indicated by weld markings 36 distributed about the bight of the hinge part 32, the hinge part 32 is ordinarily affixed to the automobile frame by welding, although in some automobile models, bolts may be used in lieu of welding. Similarly weld markings 38 indicate that the plate-like hinge member 34 is normally welded to the right-hand door of the vehicle, i.e. the passenger door as opposed to the driver's door. As evident in FIG. 1, the U-shaped hinge part 32 has spaced apart flanges 40 and 42 which nest between the aforementioned outwardly projecting wall portion 22 and a companion wall portion 44 which projects outwardly from a top portion of the hinge plate 34. The two hinge parts are pivotally joined by a hinge pin 46.

The hinge pin 46 is partially surrounded by a spring clip 48 seated in an annular groove 50 which groove is sized to prevent any upward or downward axial movement of the spring clip 48. The spring clip 48 has outwardly struck fingers 52 which trap the hinge pin 46 in the hinge assembly 10 in such fashion that the hinge pin is intended never to be removed from its hinge assembly throughout the entire operating life of the automobile. Thus, with the hinge parts 32 and 34 respectively welded to the vehicular frame and the front door and with the hinge pin trapped in its assembly to the hinge parts, there is ordinarily no need for hinge disassembly and no provision is made in the hinge assembly for any disassembly. There are, however, occasions in which the door panel or the vehicle frame may have been damaged and door removal for purposes of repair or replacement becomes highly desirable. The present invention is addressed to a method and apparatus for accomplishing such door removal and, while the drawings illustrate only the mounting hinges for the right-hand door of a vehicle, it will be understood that the method and apparatus herein disclosed is applicable to both front and rear doors of a vehicle.

Figure 3:
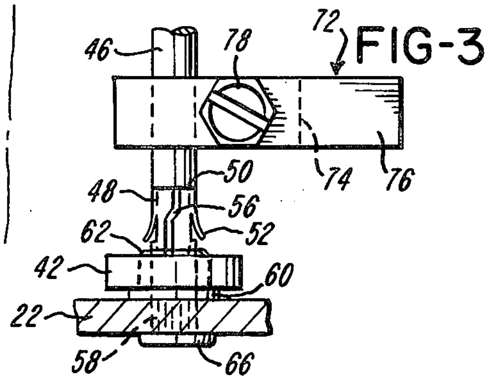
FIG. 3 is a fragmentary section view taken along the line 3—3 of FIG. 2, to illustrate the clamp, which was exploded away in FIG. 2, slidably attached to the hinge pin.

As is evident in FIGS. 1 and 2 of the drawings, the hinge pin 46 has a tapered nose 54 which, during assembly, guides the outer cylindrical wall of the hinge pin to a closely fitting slip fit relationship with circular apertures disposed in the interfitting flanges of the hinge parts 32 and 34. As can be noted in FIG. 3, the spring clip 48 has an irregularly shaped but generally axially extending slot 56 which allows the spring clip to generally secure itself in the aforementioned groove 50. Except for the outwardly struck fingers 52, the outer wall of the spring clip 48 is flush to the outer wall of the hinge pin 46 and when, as will be explained, the fingers 52 are forced inwardly, they are forced to positions flush with the remaining outer wall of the spring clip 48.

Below the spring clip 48, it can be seen that the otherwise cylindrical wall of the hinge pin 46 has been provided with axially disposed splines 58.

In assembly, the hinge parts 32 and 34 are interfitted to place holes in the flanges thereof in approximate coaxial relationship and the tapered nose 54 pushed upwardly as it appears in FIG. 2 through the appropriately aligned hinge parts 32 and 34. As the hinge pin is advanced upwardly, the outwardly struck fingers 52 first encounter the resistance of an aperture in the lower plate wall 22 and, after passage through the wall 22, encounter the resistance of a bushing 60 fitted rotatably into a relatively enlarged hole in the flange 42. The bushing 60 also is provided with an upstanding sleeve 62 which enters a hole disposed in a lowermost flange of the hinge part 32 and provides a cavity for receiving a bronze bushing 64 (FIG. 10) interposed between the outer wall of the hinge 46 and the sleeve 62 above the spring clip 48.

As the hinge pin 46 is pushed upwardly to align the hinge parts 32 and 34, the splines 58 located adjacent the enlarged head 66 of the hinge pin seize the inside wall of an aperture through the aforementioned wall 22. It can be noted that as the splines 58 seize the surrounding metal of the wall 22, the spring fingers 52 are permitted to snap outwardly, thus to preclude any inadvertent removal of the hinge pin 46.

It can also be noted that the shaft 68 is received in suitable apertures located in the upper and lower flanges 40 and 42 of the U-shaped hinge part 32 with the upper end of the shaft 68 being staked at 70 for shaft retention.

Hinge assemblies such as above described are a part of the prior art to which no claim of invention is made and are illustrated in the drawings to provide the environment in which the apparatus and method of the present invention operates.

Figure 4:
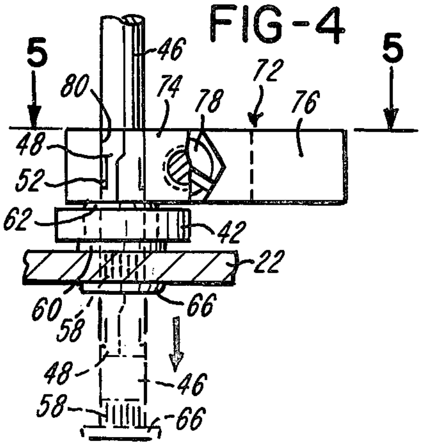
FIG. 4 is a fragmentary elevation view analagous to FIG. 3 showing in solid lines the hinge assembly and the clamp after the clamp illustrated in FIG. 3 has been slided downwardly along the hinge pin to disable a spring clip and showing, in broken lines, the hinge pin after the hinge pin has been driven axially downwardly to break a seizing fit between the hinge pin and a hinge part.
Figure 5:
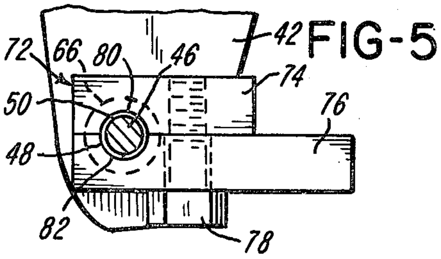
FIG. 5 is a fragmentary section view taken substantially along the line 5—5 of FIG. 4.

It can be appreciated that once the hinge assembly 10 illustrated in FIGS. 1 and 2 has been welded to an automobile frame and an automobile door and the hinge spring 18 assembled therewith, there will be scant opportunity for disassembly of the assembled hinge. The present invention is directed to a method and an apparatus for accomplishing a hinge disassembly despite the scant opportunity provided by the hinge construction. There already exists on the market hinge spring compressors such as shown in U.S. Pat. No. 262,091 and a device of this type is utilized to remove the hinge spring 18 shown in FIG. 1. There is provided, in accordance with this invention, a clamp device 72 comprising a jaw 74 containing a threaded aperture along with a jaw 76 containing an unthreaded aperture. After hinge spring removal, the clamp device is operated by means of a threaded bolt 78 whose threads clear the unthreaded jaw aperture to threadedly engage the jaw 74. The jaws 74 and 76 are formed with respective channels 80 and 82. In the operation of the clamp, the threaded bolt 78 is loosely engaged to the jaw 74 so that the hinge pin 46 can be received loosely between the channels 80 and 82. FIG. 2 shows this loose clamp assembly before attachment to the hinge pin 46 appearing in FIG. 2. To accomplish the attachment, the loosely assembled jaws 74 and 76 are spread apart as required to allow the jaws to slide laterally onto the hinge pin to a point where the hinge pin is received between the channels 80 and 82. Then the threaded bolt 78 is rotated to take up all slack between the jaws 74 and 76 such that the jaws bottom one against the other as appears in FIG. 5. When all slack has been removed as described, the channels 80 and 82 cooperate to define therebetween a circular recess which fits the cylindrical surface of the hinge pin 46 with a loose fit such that the clamp 72 can slide axially along the hinge pin 46 above the spring clip 48. In practice a grease or lubricating oil may be applied to the exposed surfaces of the hinge pin to facilitate a sliding movement of the clamp 72 axially along the hinge pin. With the clamp 72 thus assembled to the hinge pin 46, any suitable tool such as a small hammer is used to tap the clamp 72 downwardly as appears in FIG. 3 so that the fingers 52 are forced to collapse inwardly as the channels 80 and 82 move downwardly to substantially surround the spring clip 48. FIGS. 4 and 5 illustrate the position reached by the clamp 72 as a result of the foregoing tapping operation.

With the clamp 72 in the position illustrated in FIGS. 4 and 5, it can be appreciated that the spring fingers 52 have been pressed inwardly to allow these fingers to move downwardly behind the bushing 60, this being a movement that must occur if the hinge pin is to be removed from the hinge assembly without destruction of the spring clip 48. An important feature imparted to the present invention by reason of the clamp 72 is that the spring clip can be forced along with the hinge pin 46 downwardly through the aligned apertures in the hinge parts 22 and 42 without disturbing this alignment. Thus, if the spring clip 48 were to be removed before the hinge pin 46 is forced downwardly, the groove 50 would be exposed because not filled by the spring clip 48 and the hinge parts 22 and 42 would then have the opportunity to move into misalignment. Any such misalignment would provide an opportunity for the groove 50 to become snagged by the misaligned hinge parts 22 and 42 with the result that hinge pin removal would be either thwarted entirely or probably destructive to the hinge assembly sought to be disengaged.

With the clamp 72 having been lowered to press the fingers 52 inwardly in the position illustrated in FIG. 4, the hinge pin 46 is not yet free for removal because the splines 58 remain seized to the inside wall of an opening passing through the wall 22 of the hinge plate 34. Even though the hinge plate 34 may be of a sturdy metal material, it is not feasible, in most cases, to hammer the hinge pin 46 downwardly as it appears in FIG. 2, for example, because the metal of the wall 22 can flex or yield to the hammer blows and the seizing fit to the splines 58 is, for this reason, not effectively overcome by the suggested hammer blows. What is needed instead is a tool that can support the wall 22 as the hinge pin 46 is forced downwardly. Such a tool is illustrated in FIG. 6.

Figures 6, 7, 8, 9, 10:
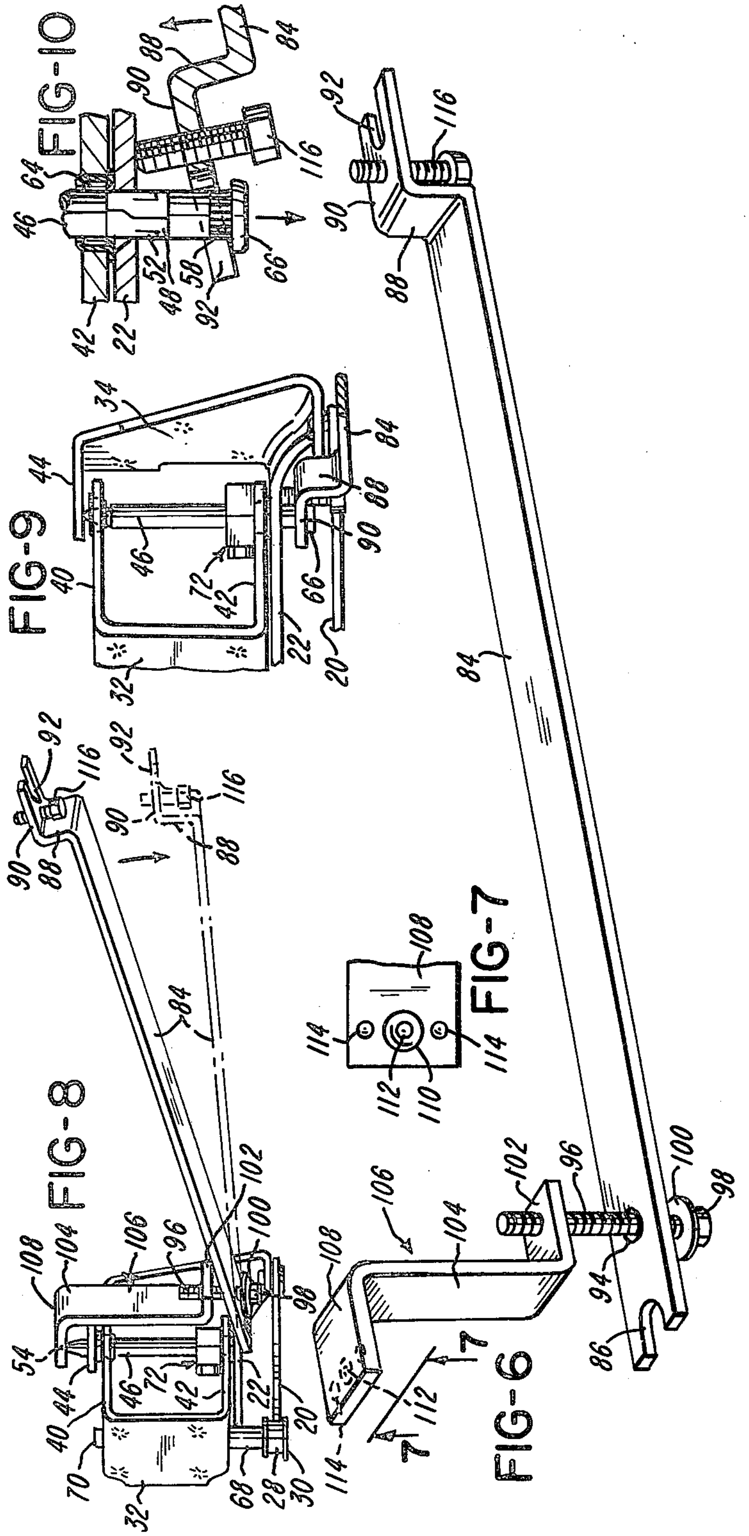
FIG. 6 is a perspective illustration of a lever in accordance with the present invention with the lever having adjustably mounted parts thereon including an adjustably mounted pry bar.
FIG. 7 is a fragmentary illustration of the pry bar taken from the direction 7—7 of FIG. 6.
FIG. 8 is an elevation view illustrating the combined lever and pry bar in operative attachment to a hinge assembly, solid lines illustrating the lever before application of a disassembly force to the lever, and broken lines illustrating the lever after application of a disassembly force.
FIG. 9 is an elevation view analagous to that of FIG. 8 but wherein the lever has been reversed end-to-end for the application of a further disassembly force.
FIG. 10 is a fragmentary elevation view with portions broken away to illustrate the action of the further disassembly force referred to in describing FIG. 9.

FIG. 6 illustrates an elongated lever 84 having a cleft 86 at the left end thereof and a Z-bend at the right end thereof, the Z-bend comprising an upstanding wall 88 and a trailing wall 90. Formed at the free end of the trailing wall 90 is a cleft 92. The cleft 92 is similar in width to the cleft 86.

Rightward of the cleft 86 and along the center line of the lever 84, the lever is provided with a bore 94, loosely receiving a threaded bolt 96 having an enlarged head 98 which confines a washer 100 adjacent the lever 84.

The bolt 96 threadedly enters a threaded aperture in a foot portion 102 which projects outwardly from one end of a trunk 104 of a pry bar 106. The upper end of the trunk 104 has an oppositely projecting flange or head portion 108 having, at the underside thereof as shown in FIG. 7, a plurality of cups or sockets milled therein. Thus, the head portion 108 has a large diameter socket 110 surrounding a smaller diameter countersink 112 forming a cup or socket. Flanking the cup 110 are two, oppositely disposed smaller cups 114 having diameters approximately the same as the countersink 112.

It will be noted that the pry bar 106 is adjustable vertically relative to the lever 84 as it appears in FIG. 6 by a rotational adjustment of the bolt 96. Also, because the bolt 96 is only loosely received in the bore 94, the pry bar has a substantial freedom of pivotal movement in all directions relative to the lever 84.

The cleft 86 is sized to receive with ample clearance the shaft of the hinge pin 46. In the use of the lever 84 with the pry bar 106 adjustably mounted thereon, the cleft 86 is engaged to the lower surface of the wall 22 of the hinge part 34. With the head 66 disposed freely of the cleft 86, the pry bar 106 is then adjusted to seat its head portion 108 on top of the hinge pin nose 54 and, if possible, to seat the nose of the hinge pin in the countersink 112. Should the extent of damage requiring repair or the unavailability of adequate space prevent engagement of the nose 54 in the countersink 112, the cups 114 provide alternate locations for engaging the nose 54 to the head portion of the pry bar 106. With the lever 84 inclined upwardly as it appears in FIG. 8, the bolt 96 is adjusted upwardly as it appears in FIG. 8 to take up as much slack as is reasonable between the lever 84 and the pry bar 106 while keeping the hinge pin centered within the cleft 86.

The lever 84 is then pressed downwardly toward the broken line position illustrated in FIG. 8, utilizing the leverage attributable to the length of the lever to press the hinge pin 46 downwardly as the lever adjacent the cleft 86 biases the hinge plate wall 22 upwardly. This action forces the splines 58 to yield with respect to the wall 22. However, due to the high leverage associated with the lever 84, the extent of yielding which occurs between the wall 22 and the splines 58 will be small and it will ordinarily be necessary for the operator to repeat the described lever action after having adjusted the threaded bolt 94 upwardly with respect to the pry bar 106 as these elements appear in FIG. 6. Such repeated operation of the lever 84 with periodic upward adjustment of the bolt 96 gradually works the hinge pin 46 downwardly until such time as the splines 58 are fully removed from their seizing engagement to the wall 22.

Even then the presence of irregularities or the like which may develop as the hinge pin is forced downwardly by action of the lever 84 and the possible presence of paint or the like on the hinge pin, may still preclude a manual removal of the hinge pin.

As an aid to the final removal of the hinge pin, the lever 84 is provided with an adjustable bolt 116 threadedly engaging in a suitable aperture through the trailing wall 90, the adjustable bolt 116 serving as a fulcrum. Thus, by using the cleft 92 to engage the hinge pin 46 above the hinge pin head 66 and adjusting the bolt 116 upwardly as it appears in FIG. 6, the cleft 92 will function as a claw which can be used to drive the hinge pin fully away from the assembled hinge parts 32 and 34.

Thus, FIG. 9 illustrates the lever 84 engaged to the hinge pin 46 as a claw and FIG. 10 illustrates schematically and by means of arrows the fulcrum action of the bolt 116 when the lever 84 is operated as a claw device.

Although the preferred embodiment of this invention has been described, it will be understood that various changes may be made within the scope of the appended claims.

Having thus described our invention we claim:

1. A tool for removing an automobile hinge pin of the type comprising a cylindrical shaft having a nose at one end thereof and an enlarged head at the opposite end thereof comprising, in combination, an elongated lever having a first cleft at one end thereof sized as to width to receive the shaft of said hinge pin, a pry bar having respective head and foot portions, adjustable means anchoring said foot portion in pivotal relation to said lever, said head portion having cup means for receiving said nose.

2. The tool of claim 1 wherein said head portion has plural cup means therein.

3. The tool of claim 1 wherein said pry bar is a generally Z-shaped and substantially rigid member including an elongated trunk, said head portion projecting outwardly from one end portion of said trunk and said foot portion projecting oppositely outwardly from the other end portion of said trunk.

4. The tool of claim 3 wherein said lever has a bore therethrough, said adjustable means comprising a threaded bolt having an enlarged head, said threaded bolt passing through said bore and threadedly engaged in said foot portion, said lever disposed between said foot portion and the enlarged head of said bolt, and said bore oversized relative to the threads of said bolt to allow pivotal movement of said lever relative to said bolt.

5. The tool of claim 1 wherein said lever has a Z-bend at the end thereof opposite the end having said first cleft.

6. The tool of claim 5 wherein said Z-bend terminates with a second cleft sized to receive said shaft.

7. The tool of claim 6 wherein said Z-bend comprises a wall portion standing upwardly from said elongated lever and a trailing wall receiving said second cleft, and including fulcrum means threadedly engaged to said trailing wall.

8. A tool for moving relative to a hinge part an automobile hinge pin of the type comprising a cylindrical shaft having a nose at one end thereof and an enlarged head at the opposite end thereof comprising, in combination, an elongated lever having means at one end thereof for engaging a surface of said hinge part, a pry bar having respective head and foot portions, adjustable means anchoring said foot portion in pivotal relation to said lever, and said head portion having cup means for receiving said nose so that a movement of said lever about said one end thereof will cause said head portion to push said hinge pin relative to said hinge part.

9. The tool of claim 8 wherein said tool has cleft means at the opposite end thereof for further moving said hinge pin relative to said hinge part.

10. The tool of claim 9 wherein said means for pushing said hinge pin relative to said hinge part includes a second cleft means at said one end of said lever for receiving said shaft.

* * * * *